United States Patent [19]

Allen et al.

[11] Patent Number: 5,075,769
[45] Date of Patent: Dec. 24, 1991

[54] VIDEO IDENTIFICATION CARD SYSTEM

[75] Inventors: Janet A. Allen, Boston; David B. Walker, Maynard, both of Mass.

[73] Assignee: Polaroid Corporation, Cambridge, Mass.

[21] Appl. No.: 138,825

[22] Filed: Dec. 28, 1987

Related U.S. Application Data

[63] Continuation-in-part of Ser. No. 21,283, Mar. 3, 1987.

[51] Int. Cl.⁵ .............................................. H04N 1/46
[52] U.S. Cl. ..................................... 358/75; 358/22
[58] Field of Search ....................... 358/13, 22, 75, 78, 358/332

[56] References Cited

U.S. PATENT DOCUMENTS

| | | | |
|---|---|---|---|
| 3,617,630 | 11/1971 | Reiffel | 358/183 |
| 4,101,926 | 7/1978 | Dischert et al. | 358/19 |
| 4,255,766 | 3/1981 | Matsuda et al. | 358/183 |
| 4,262,301 | 4/1981 | Erlichman | 358/78 |
| 4,297,724 | 10/1981 | Masuda et al. | 358/183 |
| 4,339,769 | 7/1982 | Fujita et al. | 358/332 |
| 4,471,382 | 9/1984 | Toyoda et al. | 358/22 |
| 4,503,454 | 3/1985 | Lewis | 358/13 |
| 4,527,145 | 7/1985 | Haussmann et al. | 358/19 |
| 4,613,906 | 9/1986 | Tanaka et al. | 358/22 |
| 4,652,906 | 3/1987 | Baugh | 358/22 |

Primary Examiner—John W. Shepperd
Attorney, Agent, or Firm—Edward S. Roman

[57] ABSTRACT

A video identification system for producing photo print identification cards having subject portrait, subject signature and subject related data in respective areas of the card as well as a data record including individual-specific data, an image of the subject, and an image of the signature of the subject. A personal computer controls the system to produce the identification card and the data record. The system includes a frame grabber which grabs a frame by only storing the 768 active video samples of each line of an NTSC signal for two consecutive fields. System operation may not be initiated without first having a supervisor unlock the personal computer and input a particular password. Further, each additional system operator must input their particular identification number into the personal computer whereby system security is maintained.

6 Claims, 6 Drawing Sheets

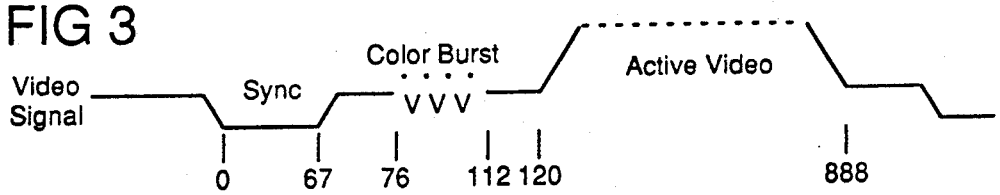
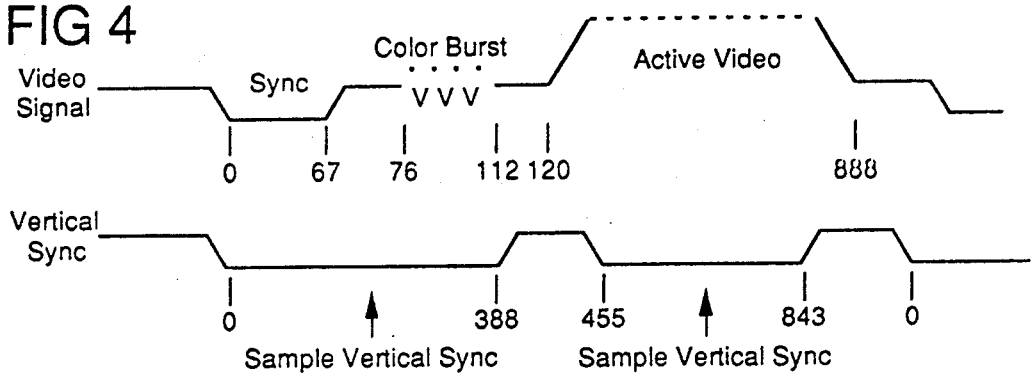
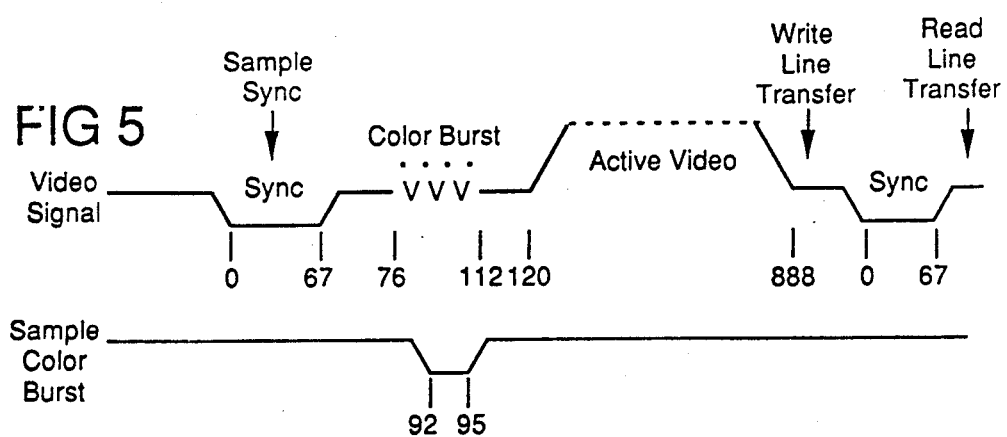

VIDEO IDENTIFICATION CARD SYSTEM

CROSS REFERENCE TO RELATED APPLICATION

This is a continuation-in-part of U.S. application Ser. No. 021,283, filed Mar. 3, 1987.

BACKGROUND OF THE INVENTION

This invention relates to a method and system of apparatus for providing composite subject/data identification cards. More particularly, it concerns a method for processing a composite video signal and apparatus for providing such cards together with a record of each card along with additional subject identifying information and data in a format which can be readily correlated to each identification card.

Camera systems for providing identification cards containing a photograph of a subject to whom the card applies, as well as other printed or graphic data, are well known in the art. Systems currently used extensively by numerous private and government organizations are exemplified by the disclosures of U.S. Pat. Nos. 3,631,773; 3,641,886; 3,678,818; 3,683,764; 3,696,716; 3,726,198 and 3,762,292. Such systems typically employ a dual optical path for presenting to the film plane of an instant camera, for example, light images representing both a portrait of the subject to be identified by the identification card as well as printed or graphic data applicable to the subject and/or to the organization issuing the card. Areas of the card reserved for the respective subject and data images are delineated by a masking arrangement of orthogonally polarized light paths in combination with a polarizing plate at the film plane of the camera to which both the subject and data images are presented. The polarizing plate may carry indicia symbolizing the authentication of the card issuing organization such as a validating signature or seal, either of which may be arranged to partially overlie both the subject and data images recorded on the ultimate identification card.

The administration of central file records by which the issuance of each identification card as well as retention of information pertaining to the subject of each card is an important adjunct to the use of identification card camera systems. While the data carrier, usually in the form of a file card, which is used in the production of each identification card serves as a file record, it has been recognized in the art that the data card is incomplete without inclusion also of a portrait of the subject to whom it applies. To accommodate this need, identification card camera systems have been developed to include a record filmstrip on which all information presented on the composite subject/data format of each successive identification card is recorded in successive frames on the record filmstrip.

The disclosure of U.S. Pat. No. 4,248,510 is exemplary of a camera system employing such a record filmstrip. Other similar camera systems have been proposed and in each such system, the record filmstrip serves as a central file record by which the authenticity of the originally issued composite/data identification card can be verified.

The above-mentioned identification card camera systems present problems of inadequate space for additional facsimile identification information such as a fingerprint or the like and from a lack of security associated with the number of personnel in a given organization having access to the camera system. The photographic identification card system and method disclosed in U.S. Pat. No. 4,516,845 issued to Blakely et al on May 14, 1985 solves these problems by providing a filmstrip record arranged to have adjacent full-frame images not only of the subject to whom the card is issued but also of a complete data card or carrier inclusive of both card data for reproduction on a composite identification card and of record data applicable to the subject and retained only on the filmstrip record. As a result, complete physical identifying facsimiles such as a portrait, signature and fingerprint may be retained on the filmstrip record and easily correlated to each issued identification card.

The system of the Blakely et al patent is embodied in a single compact and tamper-free housing enclosing an identification card camera, a photorecord camera, a card tray for supporting a data carrier including card data and record data applicable to a given subject, and an optical system by which an image of the card data on the carrier may be presented to the identification camera and by which the combined card data and record data may be presented to the record camera. The housing also encloses a microprocessor-based control system by which both cameras may additionally record an image of the subject for the identification card. Operation of both cameras is completely automated for exposure of the respective films contained therein to the data carrier and such operation is initiated by the insertion of the data carrier into the housing by an operator. Photographs of the subject, both by the record camera and by the identification camera are effected simultaneously by manual control of the operator upon being given enunciated information by the system. Also, the system includes a provision for initialization by a supervisor as well as a verification of all supervisor actions on the record filmstrip. The microprocessor-based control system periodically monitors the operational states of various controlled devices within the camera during a picture taking sequence and terminates the sequence if an unintentional change in state of one of the controlled devices is detected. This feature enhances the security aspect of the camera by detecting any attempt to change the position of or inhibit movement of the various camera components during the picture taking sequence.

While developments in prior systems of the type disclosed have satisfied the requirements of providing for additional facsimile identification and system security, the prior systems incorporate complex mechanical devices, having numerous moving parts which may be subject to malfunction and require record film or microfilm readers or projectors to be used later by personnel working with the identification record. Further, relatively large storage spaces have been required in order to store the record film for a large number of personnel. Also the record film must be reproduced in order to transfer a copy of the record base to another location. Moreover, a microfilm based data system is slow and outdated in contrast to modern computerized data systems. Therefore, a need exists for an improved identification card system which allows for additional facsimile identification information, a data record and system security while being compatible with modern computerized data system.

SUMMARY OF THE INVENTION

In accordance with the present invention, a photographic identification card system and method is provided in which a computer memory record of each identification card produced is arranged to contain not only the portrait and signature of the subject to whom the card is issued but also a complete individually-specific data record which is stored in memory and easily correlated to each issued identification card.

The system for practicing the present invention provides a frame of portrait video, processes the portrait video, provides identification card format and individual specific data, forms a combined identification card image of the portrait video, card format and individual specific data, and produces a hard copy image of the identification card image. The system also may provide a frame of signature video, process the signature frame, and combine the processed signature frame with the processed portrait frame, card format and individual specific data prior to card formation. System security is provided by required system initialization and user passwords and by producing a record of system usage.

The present method includes processing a frame of composite color video in a unique manner which simplifies personal computer processing and reduces memory space requirements. This method of processing a frame of composite color video involves digitizing a composite color video signal, serially storing only the active video component portions of the digitized composite video, serially retrieving the stored active video components and separating each of the retrieved active video components into respective digitized color components.

A principal object of the present invention is the provision of a video identification system which produces a photographic identification card and accommodates additional facsimile identification information, enhanced security against fraudulent use, decreased space requirements for record data storage, and applicability to modern computerized information systems.

Another object of the present invention is the provision of a unique method for digitally storing a frame of composite NTSC video in a format which makes decoding of the stored composite video into its color components practical, requires a minimum amount of memory space and results in a low cost method of storing an image.

A further object of the present invention is the provision of a method of processing a frame of composite NTSC video signal which maintains a selected phase relationship between each of the active video components and the color subcarrier of the video signal while only storing the active video components.

Other objects and further scope of the applicability of the present invention will become apparent from the detailed description to follow, taken in conjunction with the accompanying drawings wherein like parts are designated by like reference numerals.

BRIEF DESCRIPTION OF THE DRAWINGS

FIG. 3 is a graphic representation of a normalized digitized line signal;

FIG. 4 is a graph showing a normalized line signal and associated vertical sync;

FIG. 5 is a graphic illustration of a video line signal and an associated sample color burst;

DETAILED DESCRIPTION OF THE PREFERRED EMBODIMENTS

Figure 1:
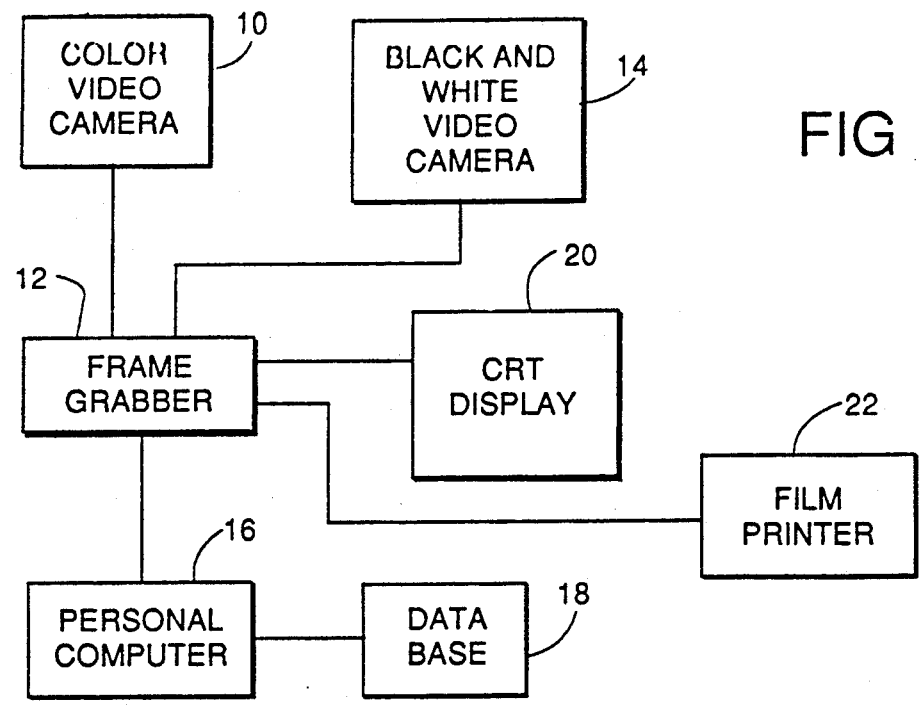
FIG. 1 is a block diagram showing the relationship of major components of the system according to the invention.

The several components of the video identification system in accordance with the present invention are shown in FIG. 1. A color video camera 10 provides a National Television Systems Committee (NTSC) format color video signal to a frame grabber 12. Likewise, a
black and white video camera 14 provides an RS170-type black and white video signal to the frame grabber 12. The frame grabber 12 is connected to a personal computer (PC) 16 which may include an alphanumeric keyboard, a built-in hard disk memory unit, floppy disk drives and a system key lock. Although shown as separate units, the frame grabber 12 may be built into the PC 16. The PC is connected to a data base 18 which contains individual-specific or subject-specific data records including such information as name, social security number, address, job history, present position, security clearance, etc. Card format information pertaining to a particular identification card layout may be stored either in the data base 18, the PC 16 itself on a built-in hard disk, or on a floppy disk which may be inserted in a PC floppy disk drive. The frame grabber 12 has outputs which are connected to a cathode ray tube (CRT) display or video monitor 20 and to a hard copy producing film printer 22.

The present video identification system provides for system security by requiring a supervisor to unlock the PC 16 with a key and type in the necessary password, identification number and/or file name on a PC keyboard before the system will operate. Additionally, each system operator is required to input their own password in order to produce an identification card after the supervisor has unlocked the PC 16 and initiated system operation. There is a record of the supervisor's and of any subsequent operator's actions because the PC 16 stores the respective passwords in memory either along with the data record and/or on a daily log.

Figure 6:
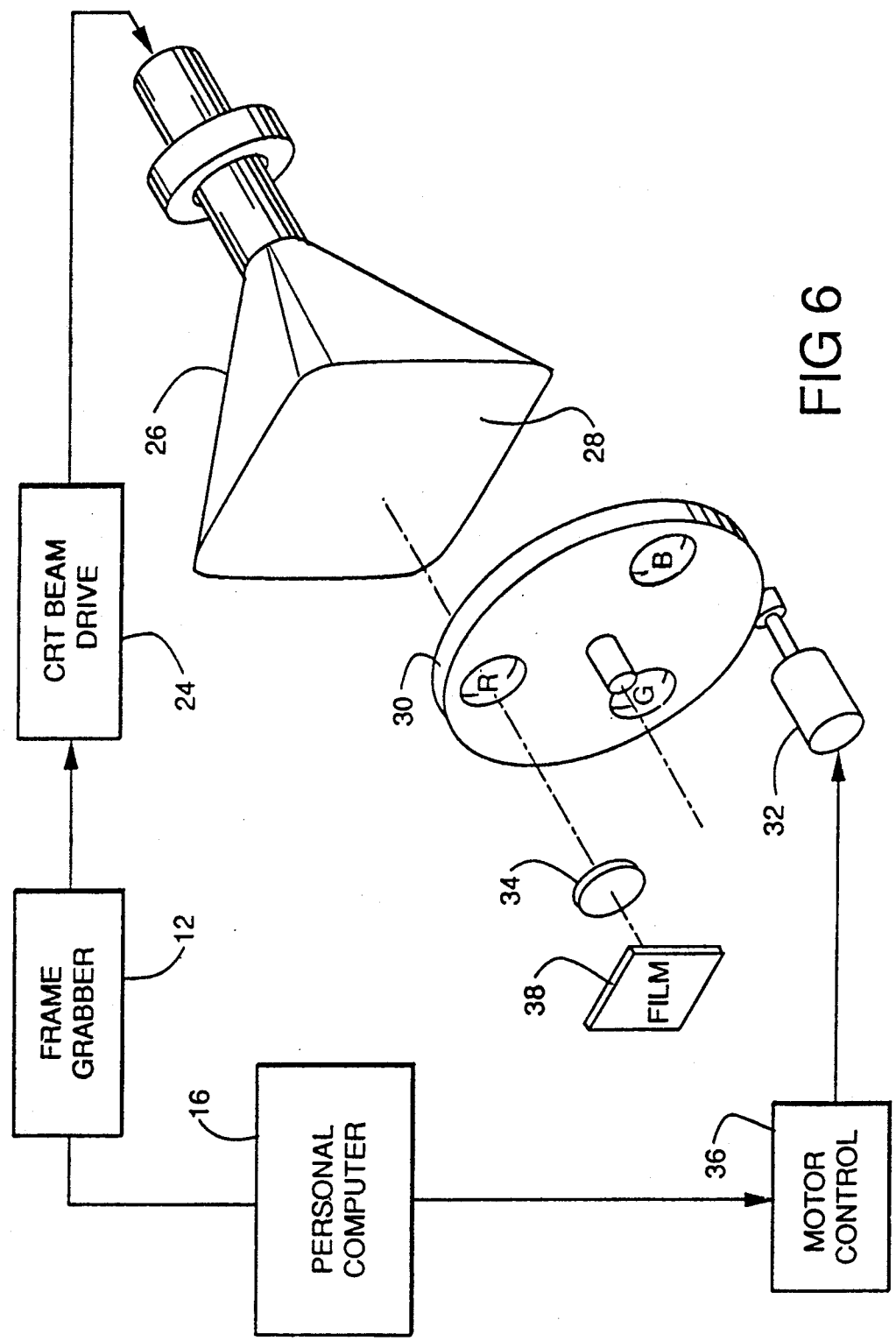
FIG. 6 is a partial schematic illustration of a system for producing a hard copy image.

In a preferred embodiment, the film printer 22 (FIG. 1) is a "Palette" computer image recorder produced by Polaroid Corporation and described in U.S. Pat. Nos. 4,488,244, 4,482,919 and 4,438,453. As shown in FIG. 6, an exemplary film printer includes a cathode ray tube (CRT) beam drive 24, a black-and-white CRT 26, a display screen 28 overlapped by a rotatably mounted filter wheel 30, a filter wheel motor drive 32, an imaging lens 34, and a motor control unit 36. Light from the display screen 28 is transmitted through a selected one of the red, green or blue color filters of the filter wheel and through the lens 34 before striking a photographic material 38. The CRT 26, the filter 30, lens 34 and photographic material 38 are housed within a light-tight chamber not shown for the sake of clarity.

Generally, in order to produce a hard copy image, the PC 16 instructs the frame grabber 12 to send a single color analog video signal to the CRT beam drive 24. The CRT beam drive 24 responds to the single color video signal and causes the black and white CRT 26 to produce an image on display screen 28. At the same time, the PC 16 instructs the motor control unit 36 to drive the motor 32 to position a selected one of the color filters in front of the display screen 28. This sequence is repeated so that the film 38 is exposed to a plurality of single color video images which added together form the composite desired hard copy image.

In accordance with the present invention, the production of a hard copy image is simplified because the frame grabber 12 processes an analog composite video signal in a manner serially separating the composite video signal into its separate color components as described in detail later herein. Thus, the frame grabber 12 can serially output single color video signals to the CRT beam drive 24 to produce corresponding single color images on the photosensitive material 38.

The PC 16 generates through software character and graphic color images in response to operator input. These computer generated images correspond to separate constant color pixel groups which are sent to the frame grabber 12 to be serially converted to respective single color analog video signals. A more detailed description of the process for producing computer graphic color images can be found in above-mentioned U.S. Pat. No. 4,536,848, incorporated by reference. Further, character and graphic images corresponding to individual retrieved by the PC 16 from data base 18 and/or a floppy disk placed in a floppy disk drive in PC 16 and converted to respective constant color pixel groups by software in PC 16. These constant color pixel groups are serially sent to the frame grabber 12 to be converted to separate single color analog video signals.

Figure 2:
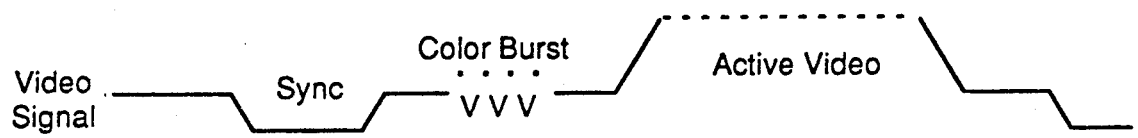
FIG. 2 is a graphic representation of a video line signal.

An understanding of the present invention is facilitated by an analysis of the characteristics of a video signal as depicted in FIG. 2 of the drawings. A video signal is made up of a plurality of line signals including active video line signals, that is, line signals containing picture information, and other line signals such as blanked line signals which contain equalization or vertical sync information. Active video line signals, such as that represented in FIG. 2, have an active video component, a color burst component which is the color key used in a color video signal to decode the colors, a sync pulse which tells where to start displaying a horizontal line, and blanking. Only the active video component of the line signal is visible when the video signal is displayed on a CRT or video monitor.

More particularly, an NTSC active video line signal color burst component has a frequency of 3.579545 MHz±10 Hz. The horizontal scanning frequency for such a signal is 2/455 × the color burst frequency. An NTSC video signal defines a color reference subcarrier signal which is a continuous signal that is synchronous with the color burst. There are 455/2 or 227.5 cycles of the color reference subcarrier per line signal which means that the phase of the color subcarrier signal and the color burst component flips 180° on every successive line signal.

A composite NTSC video signal, such as produced by color video camera 10, is an analog signal which must be digitized in order to grab or store a frame thereof. The input video signal supplied to a frame grabber is conventionally sampled at 14.31818 MHz, 4 times the color burst frequency, at a resolution of 7 or 8 bits. A 14.31818 MHz or 70 ns sampling clock provides 910 intervals or counts per line signal.

Although NTSC video signal frame grabbers are known, a low cost NTSC frame grabber with image processing capabilities is believed to be unique to the present invention. A black and white frame grabber only needs to store the luminance information whereas a color frame grabber needs to store luminance information and the amplitude and phase of the chrominance information. Recording the phase of a color video signal is necessary because even though the signal is being digitized to be stored, when it is replayed, it goes through a digital to analog converter (DAC) before going to a CRT or T.V. monitor. The monitor needs the instantaneous phase of the reconstructed analog signal to produce an accurate color image. In an analog signal, the phase of the chroma or chrominance relative to the color burst may be slowly changing along the line signal. Thus, at different instances on a displayed horizontal line, it is possible to have different colors.

In accordance with a preferred embodiment of the present invention, the frame grabber 12 grabs only the 768 active video component samples of each active video line signal of a digitized NTSC signal for two consecutive fields. Since each active video component is stored, the luminance and amplitude of the chroma is known, but there must also be an additional method for recording the phase relationship between the active video component and the color subcarrier of each line signal since the color burst component is not stored. Of course, it will be appreciated that other frame grabber designs which would, for example, either grab the entire digitized line signal including the burst, so that the phase relationship is known implicitly, or decode the NTSC signal into its Red, Green and Blue (R, G and B) color components and then store the active video portions of the R, G and B signals could be used but these designs require additional decoding circuitry and memory. The preferred frame grabber of the present invention stores a single frame of composite NTSC video in a format making decoding the stored composite video into its R, G and B color components practical and requires a minimum amount of memory and support circuitry by grabbing only the 768 samples of active video component of each digitized active video line signal using a technique that preserves the phase information. Thus, the present frame grabber 12 requires less memory and less support circuitry than other frame grabbers and is therefore very cost effective.

In accordance with a preferred embodiment of the invention, the active video component of each active video line signal is stored at a known phase relative to the color subcarrier by insuring that the first stored sample of the active video component occurs at an integral number of subcarrier cycles (4 samples) relative to the 0° sample of the color burst component. As long as this condition is met, the phase relationship of the active video component to the color subcarrier is retained and thus, the color information is preserved.

A vertical line counter keeps track of which of the 525 line signals on which of two fields is being grabbed. As shown in FIG. 4, the input is sampled at two locations relative to the falling edge of sync to find vertical sync. When vertical sync is located, the vertical line counter is reset and the frame grabber begins storing the active video components of active video line signals a fixed number of lines from the top of the frame.

A counter that counts 910 states is used while grabbing to keep track of the position along the line signal. The counter resets at the falling edge of sync. If the exact location of the 0° sample of the color burst component relative to the falling edge of sync were known, it would be possible to start storing the 768 active video component samples at a fixed location on every active video line signal. However, the position of the 0° sample of the color burst component relative to the falling edge of sync is not always known. In accordance with the present invention, four successive samples of the color burst are observed at a fixed location relative to sync for each active video line. The samples are manipulated and the sample corresponding to the 0° phase sample is determined. Initiation of sampling is locked to this 0° sample.

The plurality of stored digitized active video components of the active video line signals of the frame of composite NTSC video constitute a stored frame. The composite video is stored in a specific format, NTSC, which makes decoding of the stored video into its respective color components, R, B and G, practical. Further, only the active video component of each active video line signal is stored so as to require a minimum of storage space. Since each of the active video components are stored at a known phase relative to the color subcarrier signal and the phase of the color subcarrier signal inverts with each succeeding line signal, the phase of each line signal may be determined by merely inverting the phase of the previous line signal.

To decode the stored NTSC composite frame into its R ($E_r$), G ($E_g$) and B ($E_b$) color components, the luminance ($E_y$) and chrominance ($E_c$) of the image must be determined. These quantities can be determined with a 2 or 3 line comb filter implemented digitally in software. If luminance is given to be:

$$E_y = 0.59 \cdot E_g + 0.30 \cdot E_r + 0.11 \cdot E_b$$

and chrominance is given to be:

$$E_c = -\frac{E_b - E_y}{2.03} \cos\theta - \frac{E_r - E_y}{1.14} \sin\theta$$

where $\theta$ is the phase angle between the sample of video and the color subcarrier. When sampling at 4 times the NTSC subcarrier frequency, sampling occurs at $0° + \partial$, $90° + \partial$, $180° + \partial$, and $270° + \partial$ relative to the color subcarrier, where $\partial$ is the sampling offset. If $\partial$ can be made zero, then sampling occurs at 0°, 90°, 180° and 270° and $E_c$ can assume only 4 different values:

$$E_c/\theta = 0° = -\frac{E_b - E_y}{2.03} \qquad E_c/\theta = 180° = \frac{E_b - E_y}{2.03}$$

$$E_c/\theta = 90° = -\frac{E_r - E_y}{1.14} \qquad E_c/\theta = 270° = \frac{E_r - E_y}{1.14}$$

Thus the R and B component can be determined directly from luminance and one of the chrominance values.

$$E_b = E_y - 2.03 \cdot E_c/\theta = 0°, \quad E_y + 2.03 \cdot E_c/\theta = 180°$$

$$E_r = E_y - 1.14 \cdot E_c/\theta = 90°, \quad E_y + 1.14 \cdot E_c/\theta = 270°$$

The G color component can be determined by substituting expressions for $E_b$ and $E_r$ in the definition for luminance.

$$E_g = \frac{E_y - .11 \cdot (E_y - 2.03 \cdot E_c/\theta = 0°) - .30 \cdot (E_y - 1.14 \cdot E_c/\theta = 90°)}{.59}$$

when simplified . . .

$$E_g = E_y + 0.580 \cdot E_c/\theta = 90° + 0.378 \cdot E_c/\theta = 0° \text{ or}$$

$$E_y - 0.580 \cdot E_c/\theta = 270° - 0.378 \cdot E_c/\theta = 180°$$

The calculations required to decode the image are addition, subtraction and multiplication. Lookup tables can be used to perform the multiplications since the coefficients are fixed, so the decode algorithm can execute efficiently on microprocessors without arithmetic processors or other special hardware.

Figure 7:
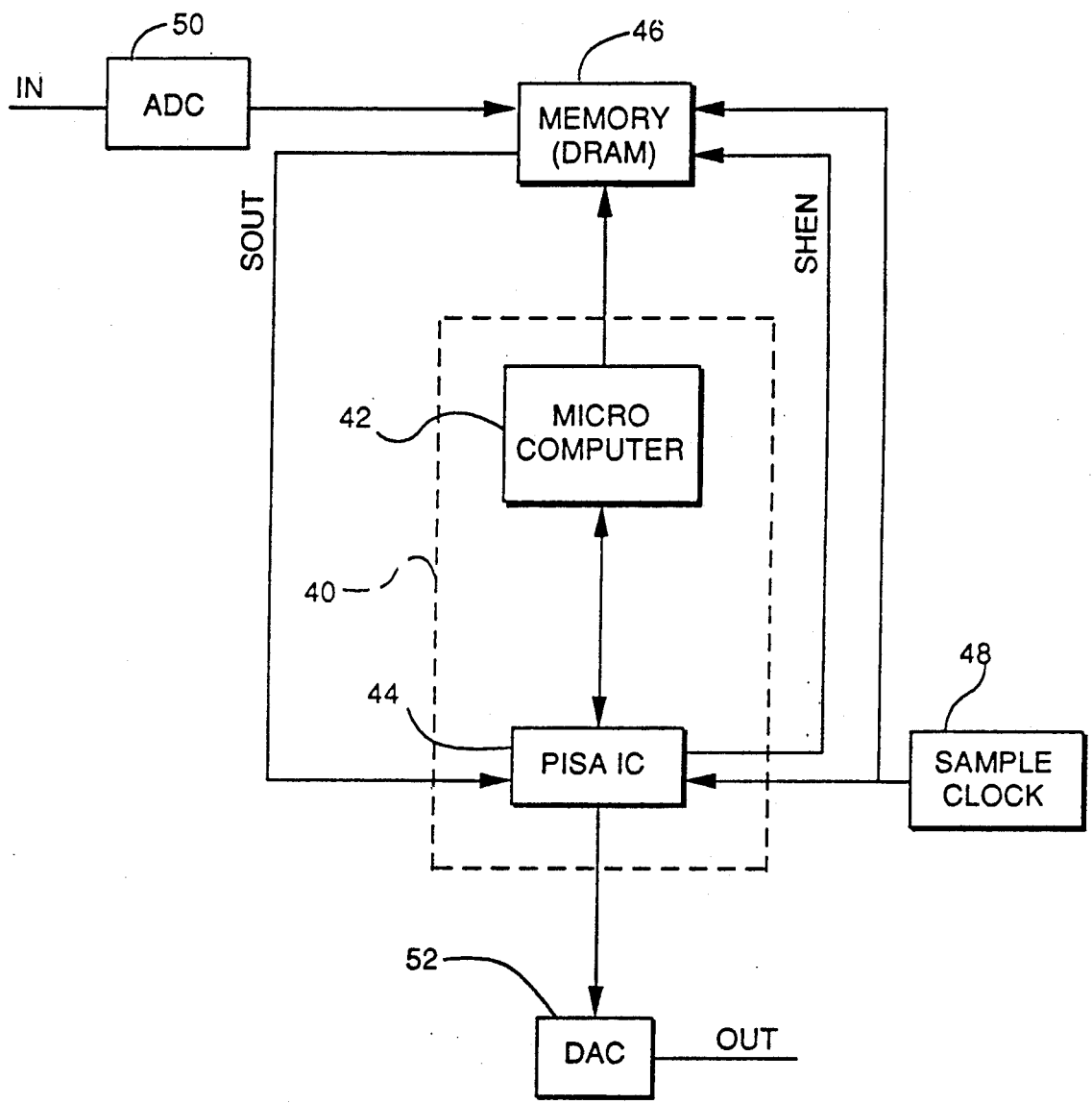
FIG. 7 is a block diagram of the frame grabbing system of the invention.

The circuitry of the frame-grabber of the present invention includes the several functional blocks as shown in FIG. 7. The circuit thus includes a controller 40 made up of a microcomputer controller section 42 and a semicustom integrated circuit (IC) section 44, a video memory or DRAM 46, a sample clock 8, an analog to digital converter (ADC) 50, and a digital to analog converter (DAC) 52. The microcomputer 42 controls the vertical slow speed timing. Software keeps track of which line of which field is being grabbed or played back. The microcomputer 42 also controls line transfers, such as a parallel shift of the contents to and from the video DRAM 46. The microcomputer 42 controls the NTSC video signal acquisition process on a video line by video line basis.

The preferred IC 44 is that manufactured by NCR Corp. under the trade name "PISA". The IC 44 controls the acquisition process within each video line signal. The IC 44 controls the horizontal high-speed timing. The input NTSC video signal is digitized at 4 times the color subcarrier frequency or 14.31818 MHz by the ADC 50. The sample clock (MCLK) 48 used to sample the video signal is phased-locked to the input color burst so that the samples are taken at exactly 0°, 90°, 180°, and 270° relative to the color burst component. The digitized signal is restored to analog form by the DAC 52.

In accordance with a preferred embodiment of the present invention, sampled active video components are stored in the frame grabber 12 in 64K by 1 TI-4161 dual ported video DRAMs 46. These video DRAMs have a 256 bit shift register which is serially accessed in addition to the 64K by 1 DRAM which is randomly accessed. The random access port is necessary for refresh, initiation of line transfers, and image processing, but only the serial port is necessary to grab and play back an image. Three devices are cascaded together forming a 3 by 256 or 768 bit shift register, 768 bits of digitized active video component of each active video line signal are shifted into the shift register. Once in the shift register, the entire contents of the shift register are transferred in parallel to a row of DRAM (a write line transfer) during the blanking interval following the active video component as shown in FIG. 5. When playing back, the contents of a row of DRAM are transferred to the shift register (a read line transfer) and then the stored active video information in the shift register is shifted out to display the stored image.

In accordance with a further feature of the invention, in order to play back a grabbed signal, the different parts of the playback signal, the delayed active video, the regenerated color burst, the sync and blanking of a visible line and vertical sync and equalization of a blank line are combined in a multiplexor and sent to the DAC 52 before going to a video monitor. The active video is in proper phase with respect to the regenerated color burst.

The principal function of the IC 44 is to sample the color burst component of the video signal, and to use this information to assure the line is stored in the correct phase relative to the color subcarrier. The IC 44 also creates timing and other data to synthesize the output signal.

Color burst sampling is important to the operation of the system because it assures the active video components are stored in the correct phase as well as contributing to produce a zero phase error. The acquired color burst samples are examined to find the number of samples the color burst is advanced or delayed from some nominal position. It is assumed that the phase error, is zero and that the phase of the burst changes 180° on each successive active video line signal. The position where acquisition of active video begins is adjusted to compensate for the advance or delay of the sampled color burst from the nominal position.

Thus there exists a minimum of four different positions where acquisition of active video component can begin, but it is necessary to implement one additional position. This additional position is required to prevent large sampling variations in the presence of horizontal sync uncertainty. For example, assume a system is implemented with four begin storage of active video positions 100 (1 cycle delayed), 101 (nominal), 102 (1 cycle advanced), and 103 (2 cycles advanced or delayed). If the color burst is measured alternating between 1 cycle delayed and 2 cycles delayed, a large positional displacement will occur since active video sampling will start at alternating positions of 100 and 103. An added position 99 representing 2 cycles delayed, eliminates this large displacement.

The microcomputer 42 controls vertical synchronization, determines the type of video line to play back (vertical sync, active video, blank video, etc.) and controls the sample clock generator. Vertical synchronization is determined by observing the state of composite sync for the last 8 half lines of video signal. If the pattern is $00111111_2$, then completion of an odd field has been observed. If the pattern is $01111110_2$, then completion of an even field has been observed. Once either of these two patterns are found, the microcomputer 42 resets the vertical line counter. If noise invalidates the pattern and completion of the appropriate field is missed, the microcomputer will predict where the field should have ended and reset the vertical line counter. The microcomputer 42 tells the IC 44 which of eight basic video line signals to play based on the line counter.

Figure 8:
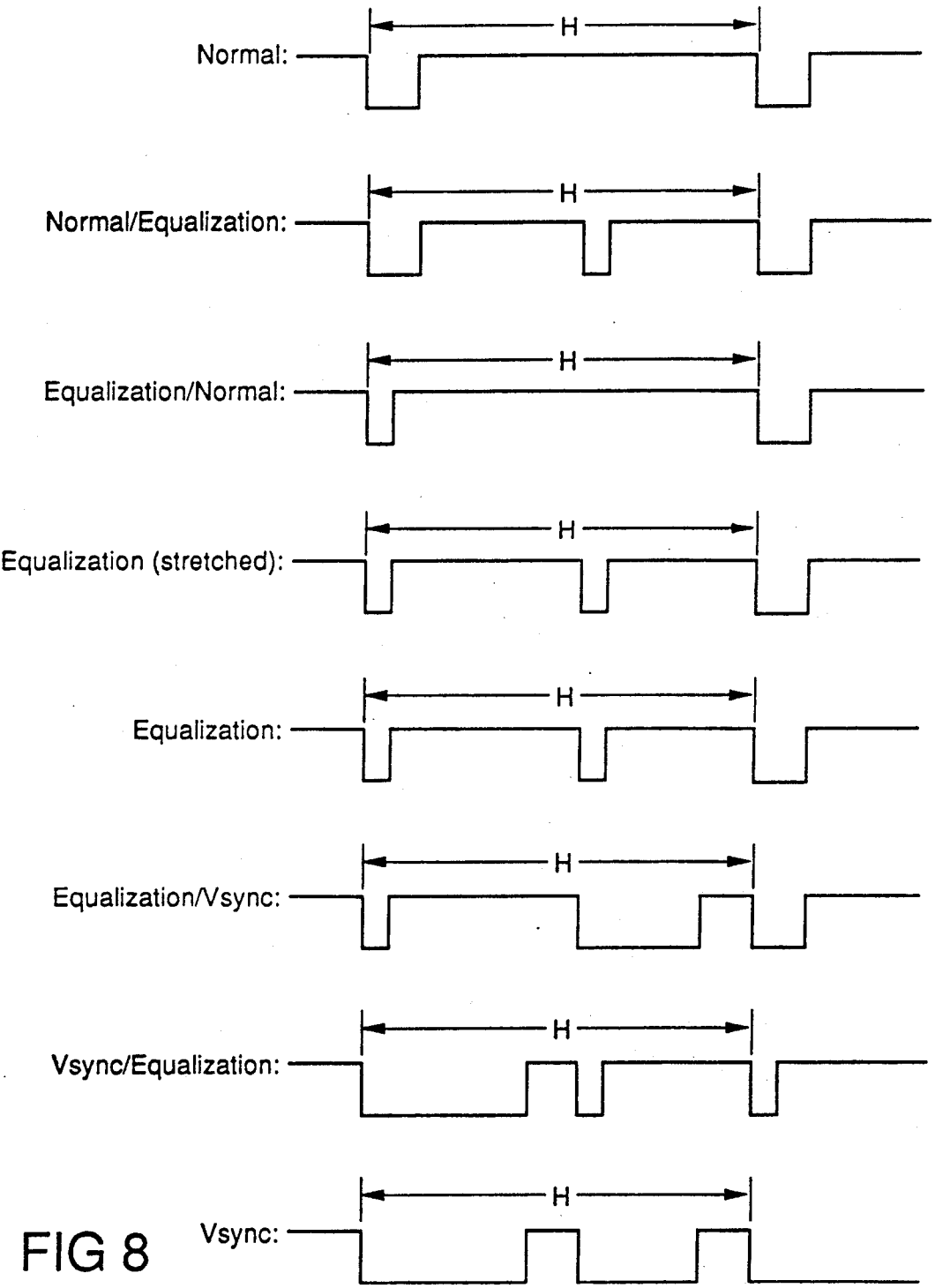
FIG. 8 is an exemplary representation of eight basic types of video line signals.

FIG. 8 is an illustration of the eight basic types of video line signals that can be synthesized by the IC 44. H represents the length of a full line. Starting from the top of FIG. 8, there is represented a normal video line signal, a half normal, half equalizing line signal, a half equalizing, half normal line signal, a full equalizing line signal without stretch, and a full equalizing line signal with stretch which is the same as a regular equalizing line signal except that the line period is an extra sampling in length. Such an equalization line signal with stretch is used to add a 180° phase shift between frames so the color subcarrier remains consistent. Equalization/Vsync represents a half equalization, half vertical sync line signal. Vsync/Equalization depicts a half vertical sync, half equalizing line signal. Vsync represents a full vertical sync line signal.

The sample timing generator is a VCO whose control voltage is produced by the microcomputer 42. The phase error must be made zero in order to decode the composite signal into its color components. Errors due to clock skew, aperture delay from the ADC, phase errors in the analog circuitry, etc. make implementation of an analog PLL circuit impractical since these errors are significant. In order to assure the sample timing generator or sampling clock is adequately locked to the color video signal, a digital PLL is implemented in software in the microcomputer 42. The phase error is measured from the color burst samples acquired by the IC 44. Four samples of each color burst component are taken from the NTSC input signal. If sampling is occurring with zero phase error, then the 0° and 180° samples should hold the same value and the difference between these values should be zero. When the phase error is non-zero, the arithmetic difference of the acquired values will not be zero and will be related to the phase error of the sampling clock to the color burst component. Since the color burst component is a sinusoid, the difference is:

$$(CB_{0°} - CB_{180°}) = A \sin\theta_e$$

Thus for a small $\theta_e$, the difference between the 0° and 180° color burst samples will be approximately proportional to the phase error. This phase error may then be filtered through a digital filter implemented in software with the result being fed to a D/A converter to produce the control voltage to the VCO generating the sampling clock pulses. It is important to note that since the phase error is measured directly from the digital input stream, sources of errors described above are eliminated. Thus, the phase error can be reduced to as close to zero as the resolution of the system allows.

Figure 9:
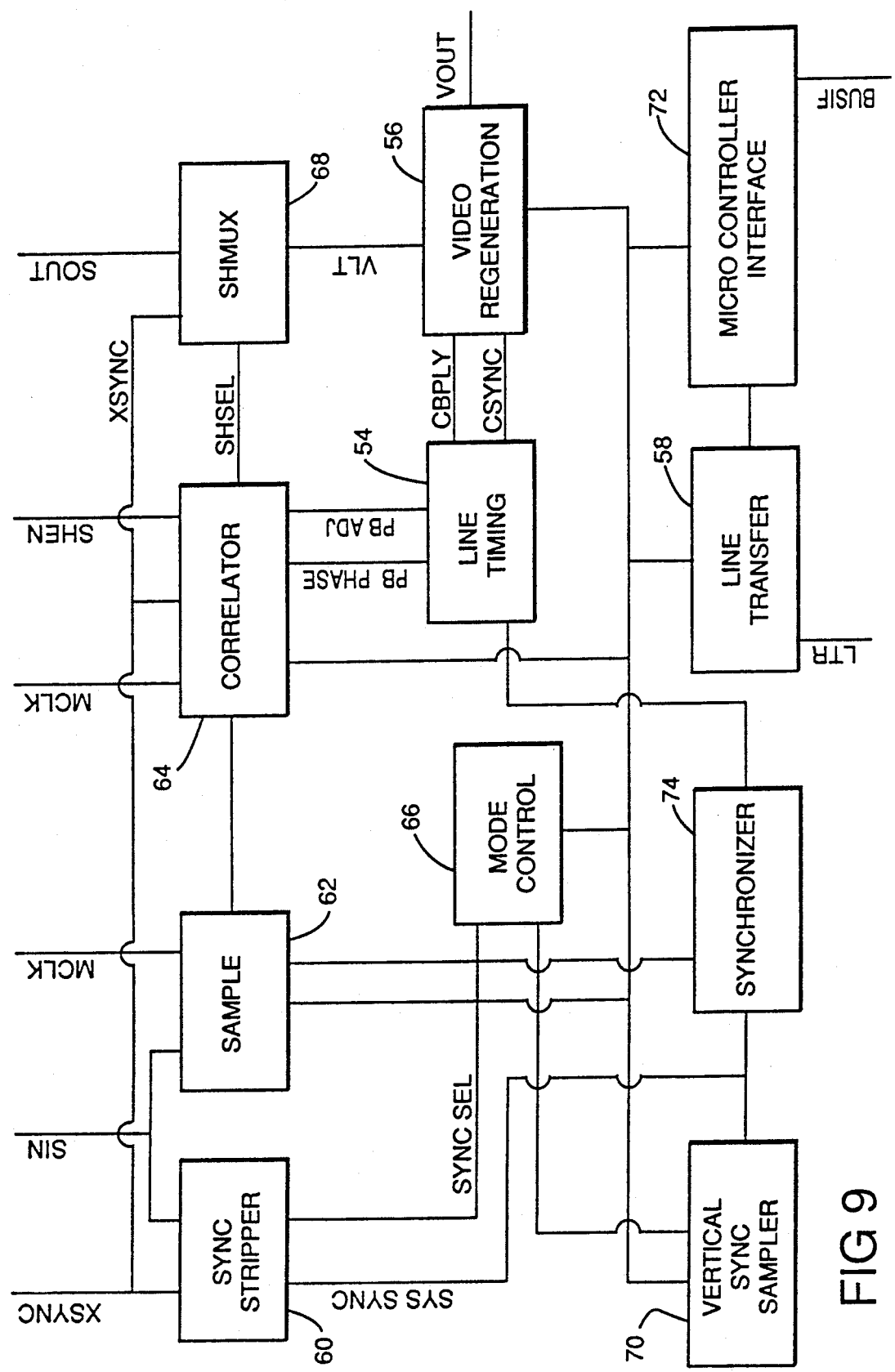
FIG. 9 is a block diagram of the major components of an exemplary I.C.

FIG. 9 provides a partial schematic of the I.C. 44 in order to aid in understanding the operation of the present system. The I.C. 44 has functional units including a line timing unit 54, a video regeneration unit 56, a line transfer unit 58, a sync stripper unit 60, a sampler unit 62, a correlator unit 64, a mode control unit 66, a shmux unit 68, a sync sampler unit 70, a micro controller interface unit 72, and a synchronizer unit 74.

More particularly, the line timing unit 54 controls video signal regeneration by indicating when to create sync, replay the color burst, and when to display video information. Blanking is implied when no other output is active. The video regeneration unit 56 is responsible for regenerating the blanking interval and merging regenerated video with blanking information. The line transfer unit 58 includes two line transfer registers. The microcomputer 42 initiates a line transfer by writing to one of the two line transfer registers. One register is provided for line transfer reads and another is provided for line transfer writes. Both registers are readable. Line transfers are designed to be asynchronous with respect to the micro controller permitting line transfers without holding the micro controller. The appropriate line transfer is initiated whenever one of these registers is written.

The sync stripper unit 60 derives system sync from digital video input or obtains it directly from an external source. The sampler unit 62 is responsible for sampling color burst component from the digitized video input. Color burst component sampling is initiated by a pulse occurring a fixed number of samples after sync is detected.

The output of the sampler 62, grab adjust, is a measure of the uncertainty in the detected sync. The correction for the uncertainty in sync is implemented in the functional unit correlator 64. The correlator 64 assures that the video data is stored and replayed in the correct phase relationship to the appropriate burst. While grabbing, the video input must be in phase with the incoming color burst components to assure storage of true colors. Video data out must be in phase with the regenerated color burst components during playback to produce an image with true color.

The mode control unit 66 enables and disables several options on the chip. The shmux unit 68 provides tapped delay to correct the digital video out signal so that digital video out is in phase with the regenerated color burst components during playback. The vertical sync sampler 70 samples the last eight half lines of system sync to find vertical sync.

The micro controller interface or bus controller 72 determines which register (if any) will be accessed by the microcomputer 42. The synchronizer 74 contains a pixel counter synchronized to the external video source. States of the pixel counter are used to produce signals to sample for vertical sync, sample the color burst, and provide a nominal position to begin storing the active video line signal.

In accordance with one embodiment of the invention, the frame grabber operates as hereinafter described. The sync signal is derived in the sync stripper 60. When the sync stripper sees two consecutive active sync samples sync is detected. The vertical sync sampler 70 samples the sync signal to find vertical sync. The sampler 62 latches four successive samples of the color burst when the counter from the synchronizer 74 tells it to sample color burst.

The sampler 62 expects that the samples will contain 0°, 90°, 180° and 270° samples in that order. The sampler 62 compares the color burst samples to determine the phase in which they were acquired. For example, color burst samples of 90°, 180°, 270° and 0° show a deviation of 90° or +1 sample. This means that if active video component is normally sampled 120 samples from sync, on this particular line, active video component should be sampled at count 119 in order for active video component to be 120 counts from the actual sync.

On playback of the line, the micro controller 42 selects the type of line to be played back by writing to the line timing unit 54. The micro controller 42 initiates a line transfer read, a parallel transfer of a row of DRAM to the shift register, during the blanking interval.

The counter in the line timing unit 54 indicates the location on the line to playback sync, color burst component and active video component. The line timing unit 54 also generates the signals which specify the phase of the line to be played back, either 0° or 180°.

Each phase of the color burst component used during playback is selected by the line timing unit 54 by a 2 bit counter that addresses 4 registers containing 0°, 90°, 180° and 270° values of the color burst component to be regenerated. These registers are written by the micro controller 42 during initialization.

The correlator 64 uses playback phase and playback adjust from the line timing 54 and grab adjust from the synchronizer 74 to generate a variable delay shift select for the active video signal being shifted out of the shift register. The video regeneration unit 56 multiplexes delayed active video from shmux unit 68 with regenerated color burst, sync, blanking. Finally, the output of the video regeneration unit 56 goes to a digital to analog converter or DAC 52 to restore the signal to analog form.

In accordance with one embodiment of the present invention, the operation of the video identification system is now described. First, a supervisor will unlock the personal computer 16 and enter a selected password or ID number in order to initiate the system. A subject who is having an identification card made up will stand in front of the color video camera 10 in order to have his or her portrait or facial image converted to a video signal by the color video camera 10. The subject having an identification card made up will also sign their name in a predetermined space on a white piece of paper and place the signature in front of the black and white video camera 14 so that a black and white video signal of their signature will be produced by the black and white video camera 14.

Next, either the supervisor or a PC operator instructs the PC 16 to enable the frame grabber 12 to grab a frame of the color video signal and a frame of the black and while video signal. A frame of digitized NTSC type color signals representing the portrait or facial image is then stored in the frame grabber freeze frame DRAM type memory. Likewise, a frame of digitized black and white video signal representing the signature is serially stored in the frame grabber freeze frame DRAM type memory. Then, the frame grabber serially processes the frame of digitized NTSC color signal representing the portrait into its R, G and B components and the frame of digitized black and white video signal representing the signature. Subsequently, the separated signals may be stored in PC memory after this initial serial processing. The operator instructs the PC 16 to select a particular card format image which provides the overall identification card format. Next, the operator instructs the PC 16 to combine the stored facial, signature and card format images with individual-specific or subject-specific data from data base 18. These images have their positions adjusted relative to one another by the PC 16 so that the information will fit onto an identification card. Then, the PC moves the combined images back into the aforementioned frame grabber freeze frame memory. The composite image in freeze frame memory is serially separated and converted from a digital to an analog format for viewing on the CRT display or monitor 20 and for forming a hard copy image of an identification card by the film printer 22.

The PC 16 is also instructed to add the subjects digitized portrait and signature to the subjects individual-specific data record in the data base. In this way, the particular identification card can easily be correlated to the individual-specific data record when necessary.

Thus, it is apparent that the present frame grabber operates differently than conventional frame grabbers which grab composite R, G and B color video signals by either separating the R, G and B color components from the composite video by electronic circuitry or hardware and then process these separated color components for subsequent color image forming purposes or have the entire composite color video signal stored in memory in either analog or digital form for use in its composite form at some later point in time without further composite video signal processing. The frame grabber 12 of the present system preferably stores the active video components of a single, composite video frame of a color video signal in digital format in a freeze frame memory and then software separates the R, G and B components of the composite video for storage in PC memory for video signal processing for subsequent image forming purposes. The R, G and B color image information stored in PC memory is readily retrievable with very little additional processing effort because the active video signal and the phase relationship between the color subcarrier portion of the color video signal and the active video signal are stored in PC memory. By processing the color video signal in this manner, less color video signal processing hardware and/or memory is required by the present video identification system.

Thus, it will be appreciated that as a result of the present invention, a highly effective improved identification card system is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. In a method for processing an NTSC analog composite video frame including a plurality of active video line signals each having an active video component and a color burst component, said active video line signals having a phase relationship with a color subcarrier signal to which the color burst component is phased, an improved processing step comprising:

serially storing at least a portion of the active video component of each successive active video line signal of the analog frame at a selected phase relationship relative to the color subcarrier signal and thereby providing a stored frame, whereby upon playback of the stored frame, an accurate image display of the frame can be produced using the stored active video components constituting the stored frame;

wherein the color burst components of the active video line signals have a color burst frequency, and the step of serially storing includes digitizing said NTSC analog composite video frame by sampling said active video line signals at a rate equal to a multiple of the color burst frequency and at a 10° or 180° offset with respect to the color subcarrier signal; and wherein each successive sample of each said active video line signal has a corresponding successive sample count value, and the step of serially storing further includes initiating storage of the active video component of each active video line signal at a determined number of subcarrier cycles from the 0° or 180° phase of the color burst component, wherein said 0° or 180° phase is determined as a function of sampling said color burst component in a plurality of successive 90° phase intervals and wherein: the sampling rate is equal to four times the color burst frequency, one of said 0° or 180° phase of the color burst component is selected to be a reference phase, said color burst component is sampled at four successive 90° phase intervals, and said initiating step further comprises the step of determining the phase difference of the phase of a selected color burst sample corresponding to a nominal sample count value and the phase reference.

2. The method of claim 1, wherein said initiating step further comprises the steps of selecting a begin storage value corresponding to the sample count value whereat storage of the active video component of each successive active video line signal is to begin; and selecting an end storage value corresponding to the sample count value whereat storage of the active video component of each successive active video line signal is to end, wherein said begin and end storage values are selected on the basis of the phase difference between the selected nominal color burst sample phase and the reference phase.

3. The method of claim 2, further comprising the step of sequentially storing the digitized active video component of each successive digitized active video line signal from the selected begin storage value up to the selected end storage value.

4. In a method for processing an NTSC analog composite video frame including a plurality of active video line signals each having an active video component and a color burst component, said active video line signals having a phase relationship with a color subcarrier signal to which the color burst component is phased, an improved processing step comprising:

serially storing at least a portion of the active video component of each successive active video line signal of the analog frame at a selected phase relationship relative to the color subcarrier signal and thereby providing a stored frame, whereby upon playback of the stored frame, an accurate image display of the frame can be produced using the stored active video components constituting the stored frame;

wherein the color burst components of the active video line signals have a color burst frequency, and the step of serially storing includes digitizing said NTSC analog composite video frame by sampling said active video line signals at a rate equal to a multiple of the color burst frequency and at a 0° or 180° offset with respect to the color subcarrier signal;

wherein each successive sample of each said active video line signal has a corresponding successive sample count value, and the step of serially storing further includes initiating storage of the active video component of each active video line signal at a determined number of subcarrier cycles from the 0° or 180° phase of the color burst component, wherein said 0° or 180° phase is determined as a function of sampling said color burst component in a plurality of successive 90° phase intervals;

wherein the sampling rate is equal to four times the color burst frequency;

wherein one of said 0° or 180° phase of the color burst component is selected to be a reference phase, and wherein said color burst component is sampled at four successive 90° phase intervals;

wherein said initiating step further comprises the step of determining the phase difference of the phase of a selected color burst sample corresponding to a nominal sample count value and the phase reference;

wherein said initiating step further comprises the steps of selecting a begin storage value corresponding to the sample count value whereat storage of the active video component of each successive active video line signal is to begin;

selecting an end storage value corresponding to the sample count value whereat storage of the active video component of each successive active video line signal is to end, wherein said begin and end storage values are selected on the basis of the phase difference between the selected nominal color burst sample phase and the reference phase; and wherein multiple begin and end storage values are provided.

5. The method of claim 4, wherein there are five sequential begin storage and end storage values and said storage values correspond to 0°, 90°, 180°, 270° and 360° phase differences between the selected nominal color burst sample phase and the reference phase.

6. In a method for processing an NTSC analog composite video frame including a plurality of active video line signals each having an active video component and a color burst component, said active video line signals having a phase relationship with a color subcarrier signal to which the color burst component is phased, an improved processing step comprising:

serially storing at least a portion of the active video component of each successive active video line signal of the analog frame at a selected phase relationship relative to the color subcarrier signal and thereby providing a stored frame, whereby upon playback of the stored frame, an accurate image display of the frame can be produced using the stored active video components constituting the stored frame;

wherein the color burst components of the active video line signals have a color burst frequency, and the step of serially storing includes digitizing said NTSC analog composite video frame by sampling said active video line signals at a rate equal to a multiple of the color burst frequency and at a 0° or 180° offset with respect to the color subcarrier signal;

wherein each successive sample of each said active video line signal has a corresponding successive sample count value, and the step of serially storing further includes initiating storage of the active video component of each active video line signal at a determined number of subcarrier cycles from the 0° or 180° phase of the color burst component, wherein said 0° or 180° phase is determined as a function of sampling said color burst component in a plurality of successive 90° phase intervals;

wherein the sampling rate is equal to four times the color burst frequency;

wherein one of said 0° or 180° phase of the color burst component is selected to be a reference phase, and wherein said color burst component is sampled at four successive 90° phase intervals;

wherein said initiating step further comprises the step of determining the phase difference of the phase of a selected color burst sample corresponding to a nominal sample count value and the phase reference;

wherein said initiating step further comprises the steps of selecting a begin storage value corresponding to the sample count value whereat storage of the active video component of each successive active video line signal is to begin;

selecting an end storage value corresponding to the sample count value whereat storage of the active video component of each successive active video line signal is to end, wherein said begin and end storage values are selected on the basis of the phase difference between the selected nominal color burst sample phase and the reference phase; and wherein the steps of selecting the begin and end storage values comprise:

selecting the 0° begin and end storage values if the phase difference between the selected nominal color burst sample phase and the reference phase is 0° and the previous active video line's begin and end storage values correspond to the 0° or 90° phase difference;

selecting the corresponding begin and end storage values if the phase difference between the selected nominal color burst sample phase and the reference phase is 90°, 180° or 270°;

selecting the 360° begin and end storage values if the phase difference between the selected nominal color burst sample phase and the reference phase is 0° and the previous active video line's begin and end storage values correspond to the 270° or 360° phase difference; and arbitrarily selecting the 0° or 360° begin and end storage values if the phase difference between the selected nominal color burst sample phase and the reference phase is 0° and the previous active video line's begin and end storage values correspond to a 180° phase difference.

* * * * *